US011320687B2

(12) United States Patent
Numata

(10) Patent No.: US 11,320,687 B2
(45) Date of Patent: May 3, 2022

(54) DISPLAY DEVICE AND ILLUMINATION DEVICE

(71) Applicant: Japan Display Inc., Tokyo (JP)

(72) Inventor: Yudai Numata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/221,907

(22) Filed: Apr. 5, 2021

(65) Prior Publication Data

US 2021/0223608 A1 Jul. 22, 2021

Related U.S. Application Data

(63) Continuation of application No. PCT/JP2019/039342, filed on Oct. 4, 2019.

(30) Foreign Application Priority Data

Oct. 9, 2018 (JP) .............................. JP2018-190841

(51) Int. Cl.
*G02F 1/1335* (2006.01)
*G02F 1/1333* (2006.01)

(52) U.S. Cl.
CPC .... *G02F 1/133507* (2021.01); *G02F 1/13338* (2013.01)

(58) Field of Classification Search
CPC ........... G02F 1/133507; G02F 1/13338; G02F 1/133526
See application file for complete search history.

(56) References Cited

U.S. PATENT DOCUMENTS

| 5,673,127 A | 9/1997 | Takahara et al. |
| 2010/0085510 A1 | 4/2010 | Okuyama et al. |
| 2011/0149201 A1 | 6/2011 | Powell et al. |
| 2015/0211707 A1* | 7/2015 | Watanabe ............. G02F 1/1339 345/667 |
| 2016/0070047 A1 | 3/2016 | Okuyama et al. |

(Continued)

FOREIGN PATENT DOCUMENTS

| JP | 55-178120 U | 12/1980 |
| JP | 02-033125 A | 2/1990 |
| JP | 2000-105550 A | 4/2000 |

(Continued)

OTHER PUBLICATIONS

International Search Report dated Dec. 10, 2019 in PCT/JP2019/039342 filed on Oct. 4, 2019, 2 pages.

*Primary Examiner* — Phu Vu

(74) *Attorney, Agent, or Firm* — Oblon, McClelland, Maier & Neustadt, L.L.P.

(57) ABSTRACT

According to one embodiment, a display device includes a display panel including a first substrate including a first transparent substrate having a first main surface, a first opposite and a side surface, a second substrate including a second transparent substrate having a second main surface and a second opposite surface, and a liquid crystal layer located between the first substrate and the second substrate, a light emitting element opposed to the side surface, a third transparent substrate, and a transparent layer located between the display panel and the third transparent substrate and having a second refractive index that is lower than a first refractive index.

12 Claims, 10 Drawing Sheets

(56) References Cited

U.S. PATENT DOCUMENTS

2016/0116768 A1\* 4/2016 Okuyama ............. G02F 1/1334
349/33

FOREIGN PATENT DOCUMENTS

| JP | 2002-196316 A | | 7/2002 |
|---|---|---|---|
| JP | 2010-092682 A | | 4/2010 |
| JP | 2016-057338 A | | 4/2016 |
| KR | 20120119020 | \* | 10/2012 |

\* cited by examiner

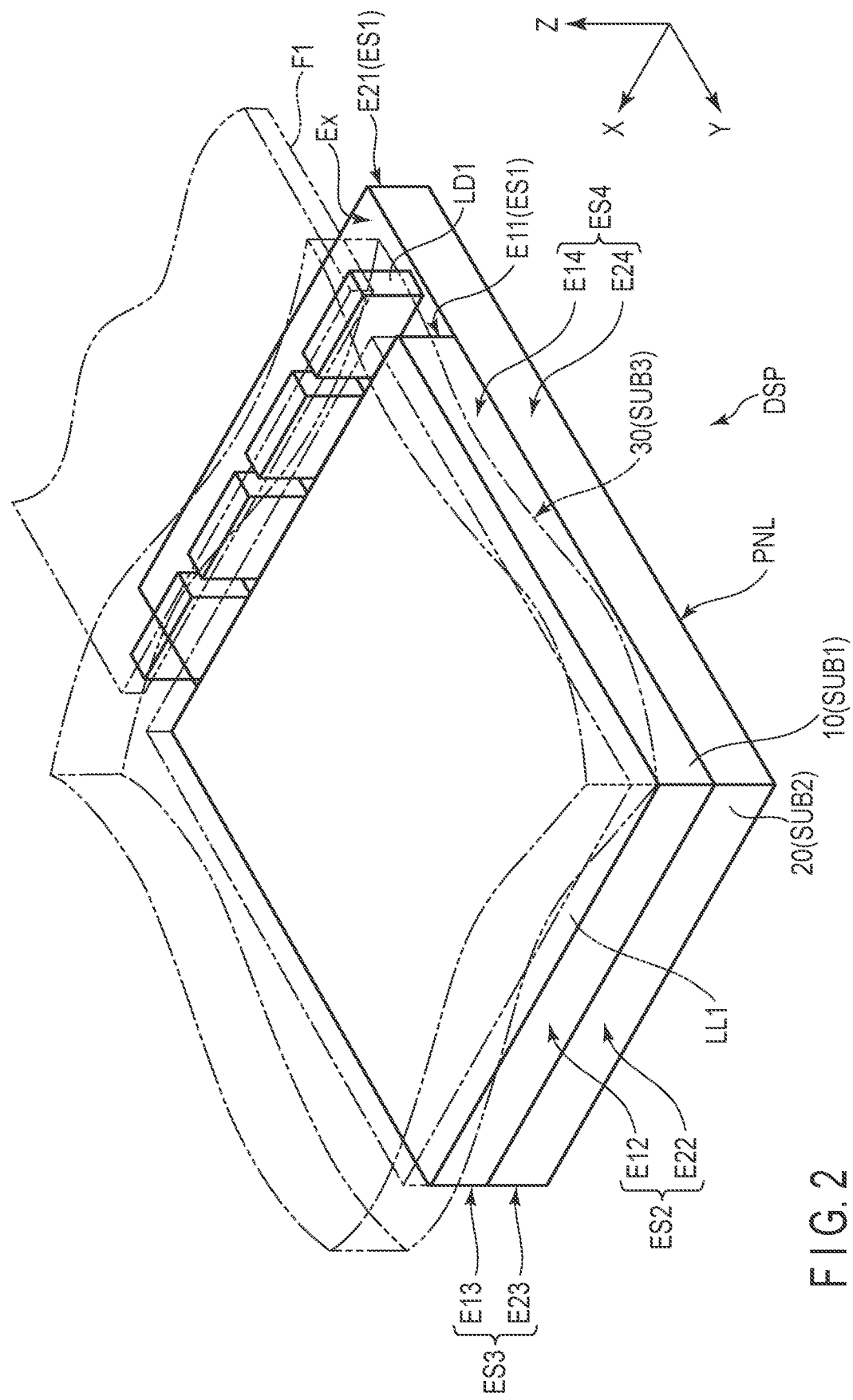
F I G. 2

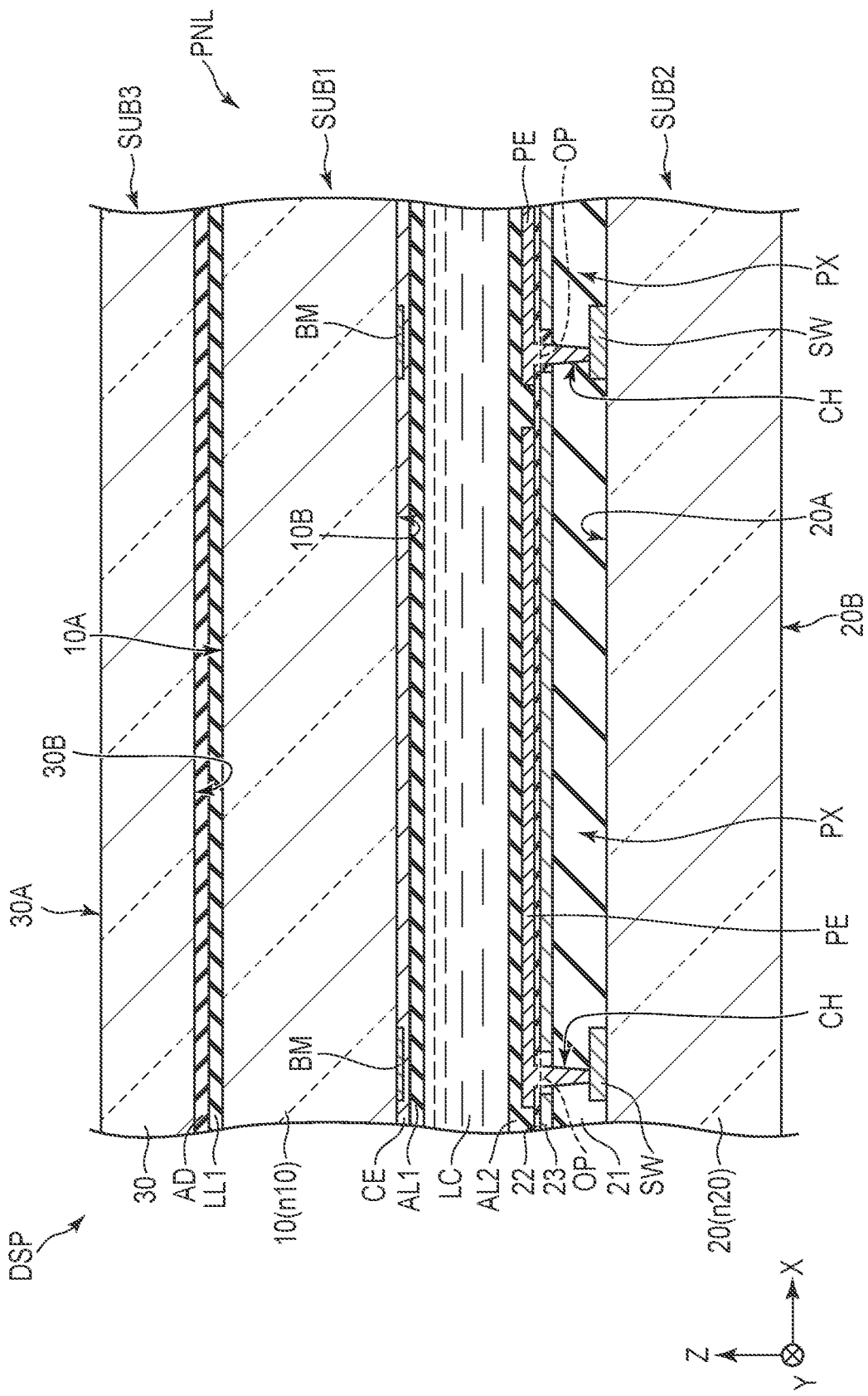
F I G. 5

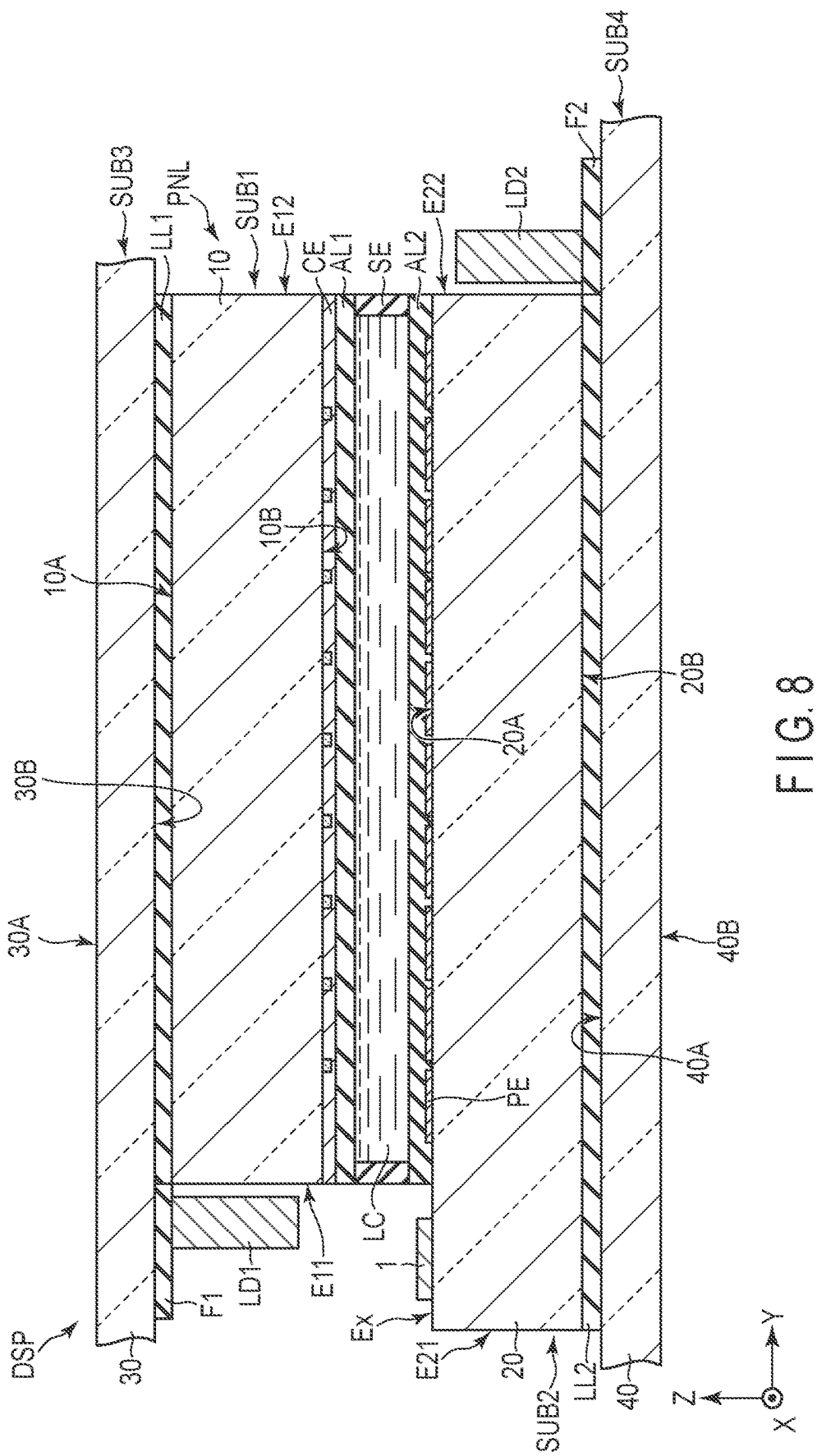
F I G. 8

DISPLAY DEVICE AND ILLUMINATION DEVICE

CROSS-REFERENCE TO RELATED APPLICATIONS

This application is a Continuation Application of PCT Application No. PCT/JP2019/039342, filed Oct. 4, 2019 and based upon and claiming the benefit of priority from Japanese Patent Application No. 2018-190841, filed Oct. 9, 2018, the entire contents of all of which are incorporated herein by reference.

FIELD

Embodiments described herein relate generally to a display device and an illumination device.

BACKGROUND

In recent years, various types of display devices have been proposed. An illumination device including a light modulating layer whose light modulating element is bonded to a light guide and contains a bulk and fine particles having optical anisotropy, is disclosed. As another example, a light source device containing polymer dispersed liquid crystal and including a light conversion unit that converts the intensity of incident light, is disclosed.

BRIEF DESCRIPTION OF THE DRAWINGS

FIG. 2 is a perspective view showing a main component of the display device shown in FIG. 1.

FIG. 5 is a sectional view showing another example of the configuration of the display device shown in FIG. 3.

FIG. 8 is a sectional view showing another example of the configuration of the display device shown in FIG. 4.

DETAILED DESCRIPTION

Figure 1:
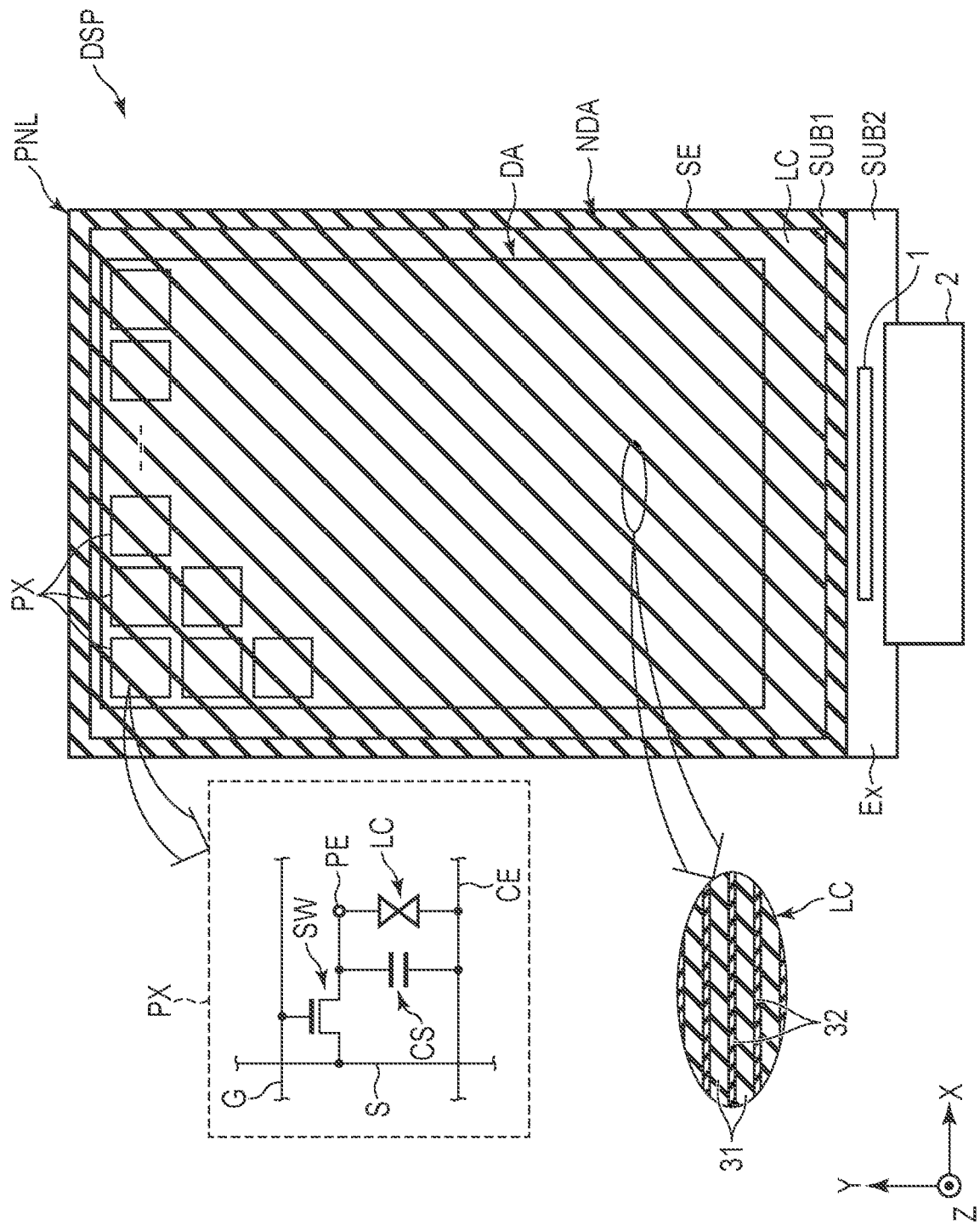
FIG. 1 is a plan view showing an example of a configuration of a display device of an embodiment.

In general, according to one embodiment, a display device comprising: a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, and a liquid crystal layer located between the first substrate and the second substrate and containing striped polymers and liquid crystal molecules; a light emitting element opposed to the side surface to emit light toward the side surface; a third transparent substrate opposed to the display panel; and a transparent layer located between the display panel and the third transparent substrate and having a second refractive index that is lower than a first refractive index of the first transparent substrate and the second transparent substrate.

According to another embodiment, an illumination device comprising: a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, and a liquid crystal layer located between the first substrate and the second substrate and containing striped polymers and liquid crystal molecules; a light emitting element opposed to the side surface to emit light toward the side surface; a third transparent substrate opposed to the display panel; and a transparent layer located between the display panel and the third transparent substrate and having a second refractive index that is lower than a first refractive index of the first transparent substrate and the second transparent substrate.

According to yet another embodiment, a display device comprising: a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, a liquid crystal layer located between the first substrate and the second substrate and containing striped polymers and liquid crystal molecules, and a transparent layer having a second refractive index that is lower than a first refractive index of the first transparent substrate and the second transparent substrate and provided on at least one of the first main surface and the second opposite surface; and a light emitting element opposed to the side surface to emit light toward the side surface.

An embodiment will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 is a plan view showing an exemplary configuration of a display device DSP of the present embodiment. In this exemplary configuration, a first direction X, a second direction Y and a third direction Z are orthogonal to each other, but may intersect at an angle other than 90 degrees. The first direction X and second direction Y correspond to directions parallel to the main surface of a substrate included in the display device DSP, its opposing surface and the like, and the third direction Z corresponds to the thickness direction of the display device DSP. In the present specification, a direction from a second substrate SUB2 to a first substrate SUB1 may sometimes be referred to as "upward" (or simply "up"), and a direction from the first substrate SUB1 to the second substrate SUB2 may sometimes be referred to as "downward" (or simply "down"). In the phrases "a second member on (above) a first member" and "a second member below (under) a first member", the second member may be in contact with the first member or may be separated from the first member. In addition, viewing the X-Y plane defined by the first direction X and second direction Y from the head of the arrow indicating the third direction Z will be referred to as a planar view.

In the present embodiment, a liquid crystal display device to which polymer dispersed liquid crystal is applied will be described as an example of the display device DSP. The display device DSP includes a display panel PNL, an IC chip 1 and a wiring substrate 2.

The display panel PNL includes a first substrate SUB1, a second substrate SUB2, a liquid crystal layer LC and a seal SE. The first substrate SUB1 and second substrate SUB2 are formed like a flat plate that is parallel to the X-Y plane. The first substrate SUB1 and second substrate SUB2 are superposed in planar view. The first substrate SUB1 and second substrate SUB2 are bonded by the seal SE. The liquid crystal layer LC is held between the first substrate SUB1 and second substrate SUB2 and sealed by the seal SE. In FIG. 1, the liquid crystal layer LC and the seal SE are indicated by different hatched lines.

As schematically shown in an enlarged scale in FIG. 1, the liquid crystal layer LC includes polymer dispersed liquid crystal including polymers 31 and liquid crystal molecules 32. In the example, the polymers 31 are liquid crystal polymers. The polymers 31 are shaped like stripes extending along the first direction X. The liquid crystal molecules 32 are dispersed in a gap between the polymers 31 and aligned such that their long axes are along the first direction X. Each of the polymers 31 has optical anisotropy or refractive anisotropy, as does each of the liquid crystal molecules 32. The responsiveness of the polymers 31 to an electric field is lower than that of the liquid crystal molecules 32 to the electric field.

In the example, the alignment direction of the polymers 31 hardly varies regardless of the presence or absence of an electric field, whereas the alignment direction of the liquid crystal molecules 32 varies with an electric field when a voltage that is higher than a threshold voltage is applied to the liquid crystal layer LC. When no voltage is applied to the liquid crystal layer LC, the optical axes of the polymers 31 and liquid crystal molecules 32 are parallel to each other, and light incident on the liquid crystal layer LC is hardly scattered and is transmitted through the liquid crystal layer LC (transparent state). When no voltage is applied to the liquid crystal layer LC, the optical axes of the polymer 31 and liquid crystal molecules 32 intersect each other, and light incident on the liquid crystal layer LC is scattered in the liquid crystal layer LC (scattered state).

The display panel PNL includes a display area DA for displaying an image and a non-display area NDA shaped like a frame to surround the display area DA. The seal SE is located in the non-display area NDA. The display area DA includes pixels PX arranged in a matrix in the first direction X and second direction Y.

As shown in an enlarged scale in FIG. 1, each of the pixels PX includes a switching element SW, a pixel electrode PE, a common electrode CE, a liquid crystal layer LC and the like. The switching element SW is configured by, for example, a thin film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The pixel electrode PE is opposed to a common electrode CE to drive the liquid crystal layer LC (liquid crystal molecules 32 in particular) by an electric field generated between the pixel electrode PE and the common electrode CE. A capacitor CS is formed, for example, between an electrode whose potential is equal to that of the common electrode CE and an electrode whose potential is equal to that of the pixel electrode PE.

The second substrate SUB2 has an extended portion Ex. In the example shown, the extended portion Ex corresponds to an area in which the second substrate SUB2 is not superposed on the first substrate SUB1.

The IC chip 1 and wiring substrate 2 are each connected to the extended portion Ex. The IC chip 1 includes, for example, a display driver that outputs signals necessary for image display. The wiring substrate 2 is a flexible printed circuit board that can be folded. Note that the IC chip 1 may be connected to the wiring substrate 2. Though the IC chip 1 and wiring substrate 2 may read signals out of the display panel PNL, they mainly function as signal sources for supplying signals to the display panel PNL.

FIG. 2 is a perspective view showing a main component of the display device DSP shown in FIG. 1.

The display device DSP includes a plurality of light emitting elements LD1, a transparent layer LL1 and a third substrate SUB3 in addition to the display panel PNL. As an example, the third substrate SUB3 includes a window glass, a windshield for automobiles, an ultraviolet (UV) protection film, a decorative film, a touch panel, a liquid crystal panel and a lens. The number of light emitting elements LD1 may be one.

The first substrate SUB1 includes a transparent substrate 10. The transparent substrate 10 has a side surface E11 toward the second direction Y, a side surface E12 opposed to the side surface E11 in the second direction Y, a side surface E13 toward the first direction X, and a side surface E14 opposed to the side surface E13 in the first direction X. The side surfaces E13 and E14 each intersect the side surfaces E11 and E12. The second substrate SUB2 includes a transparent substrate 20. The transparent substrate 20 has a side surface E21 toward the second direction Y, a side surface E22 opposed to the side surface E21 in the second direction Y, a side surface E23 toward the first direction X, and a side surface E24 opposed to the side surface E23 in the first direction X. The side surface E21 extends toward the same direction as the side surface E11 in the second direction Y. The side surface E22 is directed toward a direction opposite to the side surface E21 in the second direction Y. In other words, the side surface E22 is directed toward a direction opposite to side surface E11. The side surfaces E23 and E24 each intersect the side surfaces E21 and E22.

The side surfaces E11 and E21 extend along the first direction X and do not coincide in the second direction Y. The extended portion Ex extends along the second direction Y between the side surfaces E11 and E21. In other words, the extended portion Ex extends outward from the side surface E11 in the second direction Y. At least one of the side surfaces E11 and E21 may be referred to as a side surface ES1 of the display panel PNL. The side surfaces E12 and E22 extend along the first direction X and coincide in the second direction Y. The side surfaces E12 and E22 may collectively be referred to as a side surface ES2 of the display panel PNL. The side surface ES2 is opposed to the side surface E11. The side surfaces E13 and E23 extend along the second direction Y and coincide in the first direction X. The side surfaces E13 and E23 may collectively be referred to as a side surface ES3 of the display panel PNL. The side surface ES3 intersects the side surfaces ES1 and ES2. The side surfaces E14 and E24 extend along the second direction Y and coincide in the first direction X. The side surfaces E14 and E24 may collectively be referred to as a side surface ES4 of the display panel PNL. The side surface ES4 intersects the side surfaces ES1 and ES2.

The light emitting elements LD1 are arranged at intervals in the first direction X and opposed to the side surface E11. In the example shown, the light emitting elements LD1 are superposed on the extended portion Ex. The light emitting elements LD1 are connected to a wiring substrate F1. The light emitting elements LD1 are, for example, light emitting diodes. Although not described in detail, the light emitting elements LD1 each include a red light emitting portion, a green light emitting portion and a blue light emitting portion. The light emitted from the light emitting elements LD1 travels along the direction of the arrow indicating the second direction Y. In other words, the light emitting elements LD1 emit light toward the side surface E11.

The third substrate SUB3 is opposed to the display panel PNL. In the example shown, the third substrate SUB3 is located opposite to the second substrate SUB2 with respect to the first substrate SUB1 in the third direction Z. The third substrate SUB3 includes a transparent substrate 30. The transparent substrate 30 is opposed to the display panel PNL. In the example shown, the transparent substrate 30 is located opposite to second substrate SUB2 with respect to the first substrate SUB1 in the third direction Z. The transparent substrate 30 is larger than the transparent substrate 10 and the transparent substrate 20 in the X-Y plane. In other words, the transparent substrate 30 is larger than the display panel PNL in the X-Y plane. The transparent substrate 30 is thus opposed to the light emitting elements LD1, wiring substrate F1 and extended portion Ex. Note that the size of the transparent substrate 30 may be equal to or smaller than that of the first substrate SUB1 in the X-Y plane. In this case, the transparent substrate 30 is not opposed to the light emitting elements LD1, wiring substrate F1 or extended portion Ex. The transparent layer LL1 is located between the first substrate SUB1 and the third substrate SUB3. Note that each of the transparent substrates 10, 20 and 30 may be formed of a plurality of transparent substrates. The first substrate SUB1 may include the transparent layer LL1.

Figure 3:
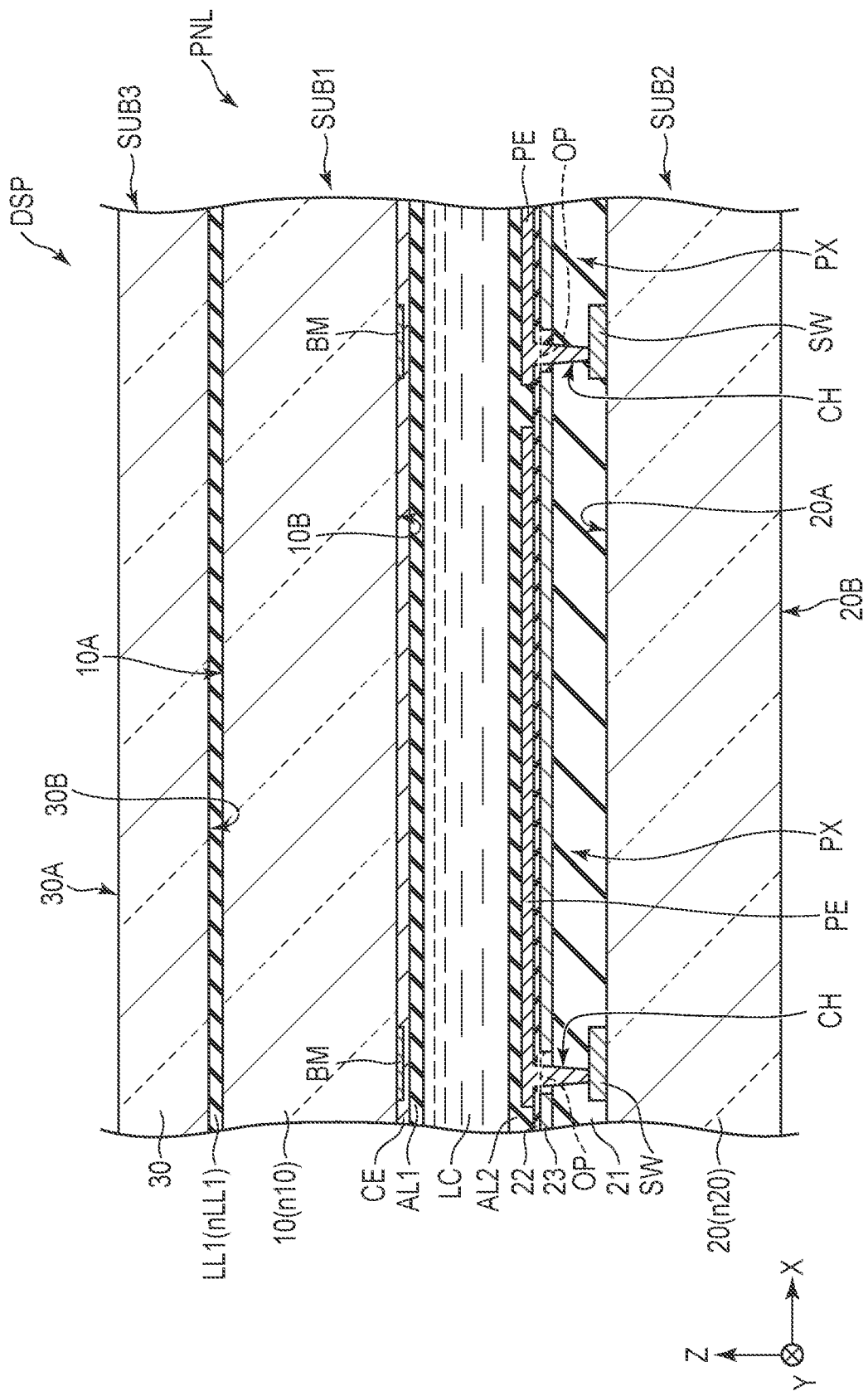
FIG. 3 is a sectional view showing an example of a configuration of the display device shown in FIG. 2.

FIG. 3 is a sectional view showing an example of the configuration of the display device DSP shown in FIG. 2. Here is a description of the section of the X-Z plane defined by the first direction X and the third direction Z.

The second substrate SUB2 includes a transparent substrate 20, insulating layers 21 and 22, a capacitance electrode 23, a switching element SW, a pixel electrode PE and an alignment film AL2. The second substrate SUB2 further includes the scanning line G and signal line S shown in FIG. 1. The transparent substrate 20 has a main surface (top surface) 20A and its opposed surface (undersurface) 20B. The main surface 20A and its opposed surface 20B expand substantially in parallel to the X-Y plane. The switching element SW is placed closer to the main surface 20A. In the example shown, the switching element SW is located on the main surface 20A. The insulating layer 21 covers the switching element SW and has a contact hole CH penetrating to the switching element SW. The capacitance electrode 23 is located on the insulating layer 21 and has an opening OP. The insulating layer 22 is located on the capacitance electrode 23. The insulating layer 22 is located on the insulating layer 21 at the opening OP. The pixel electrode PE is arranged for each pixel PX and located on the insulating layer 22. The pixel electrode PE is electrically connected to the switching element SW via the opening OP and the contact hole CH. The pixel electrode PE is superposed on the capacitance electrode 22 with the insulating layer 23 therebetween to form the capacitance CS of the pixel PX. The alignment film AL2 is provided along the first direction X continuously without interruption to cover a plurality of pixel electrodes PE. Between adjacent pixel electrodes PE in the first direction X, the alignment film AL2 is in contact with the insulating layer 22. The second substrate SUB2 is not limited to the example shown, but may include another insulating layers and other various layers.

The first substrate SUB1 includes a transparent substrate 10, a light shielding layer BM, a common electrode CE, a transparent substrate 40 and an alignment film AL1. The transparent substrate 10 includes a main surface (top surface) 10A and its opposed surface (undersurface) 10B. The main surface 10A and its opposed surface 10B expand substantially in parallel to the X-Y plane. The transparent substrate 10 is located closer to the main surface 20A of the transparent substrate 20. The opposed surface 10B of the transparent substrate 10 is opposed to the main surface 20A with the liquid crystal layer LC therebetween. The light shielding layer BM and the common electrode CE are arranged closer to the opposed surface 10B. The light shielding layer BM is located, for example, directly above the switching element SW and directly above the scanning line G and signal line S (neither of which is shown). The common electrode CE is provided over the pixels PX to directly cover the light shielding layer BM. The common electrode CE is electrically connected to the capacitance electrode 23 and has the same potential as that of the capacitor electrode 23. The alignment film AL1 covers the common electrode CE. Note that the first substrate SUB1 is not limited to the example shown, but may include another insulating layer and other various layers.

The third substrate SUB3 includes a transparent substrate 30. The transparent substrate 30 has a main surface (top surface) 30A and its opposed surface (undersurface) 30B. The main surface 30A and its opposed surface 30B expand substantially in parallel to the X-Y plane. The transparent substrate 30 is located closer to the main surface 10A of the transparent substrate 10. The opposed surface 30B of the transparent substrate 30 is opposed to the main surface 10A with the transparent layer LL1 therebetween. Note that the third substrate SUB3 is not limited to the example shown, but may include various layers as well as the transparent substrate 30.

The transparent layer LL1 is located between the first substrate SUB1 and the third substrate SUB3. In the example shown, the transparent layer LL1 is disposed over the entire surface of the main surface 10A and is in contact with the main surface 10A and its opposed surface 30B. Note that the transparent layer LL1 may not be disposed over the entire surface of the main surface 10A. Various layers may be arranged between the transparent layer LL1 and the transparent substrate 10. In addition, various layers may be arranged between the transparent layer LL1 and the transparent substrate 30.

The liquid crystal layer LC is located between the first substrate SUB1 and the second substrate SUB2 and is in contact with the alignment films AL1 and AL2.

The transparent substrates 10, 20 and 30 are insulating substrates such as glass substrates and plastic substrates. Note that the transparent substrate 30 may be, for example, a film such as an ultraviolet (UV) protection film and a decorative film, a touch panel, a liquid crystal panel and a lens. The insulating layer 21 is formed of silicon oxide, silicon nitride, silicon oxynitride, and a transparent insulating material such as acrylic resin. As one example, the insulating layer 21 includes an inorganic insulating layer and an organic insulating layer. The insulating layer 22 is an inorganic insulating layer such as silicon nitride. The capacitance electrode 23, pixel electrode PE and common electrode CE are transparent electrodes formed of a transparent conductive material such as indium tin oxide (ITO) and indium zinc oxide (IZO). The light shielding layer BM is, for example, a conductive layer whose resistance is lower than that of the common electrode CE. As one example, the light shielding layer BM is formed of an opaque metallic material such as molybdenum, aluminum, tungsten, titanium and silver. The transparent layer LL1 is an insulating layer formed of an organic material such as siloxane resin and fluorine resin. The transparent layer LL1 may be a transparent adhesive layer such as silicon-based optical clear adhesive (OCA) and optical clear resin (OCR). The alignment films AL1 and AL2 are horizontal alignment films having alignment restriction force and being substantially parallel to the X-Y plane. As one example, the alignment films AL1 and AL2 are aligned along the first direction X. Note that the alignment may be rubbing or optical alignment.

The transparent substrate 10 has a refractive index of n10, the transparent substrate 20 has a refractive index of n20, and the transparent layer LL1 has a refractive index of nLL1. The refractive index nLL1 is lower than n10 and n20. As one example, the transparent substrates 10 and 20 are formed of the same material and their refractive indices n10 and n20 are equivalent. The "equivalent refractive indices" is not limited to the case where a difference between the refractive indices is zero, but includes the case where the difference is 0.03 or less. For example, the difference of each of refractive indices n10 and n20 is about 1.5, and that of refractive index nLL1 is 1.0 or more to 1.41 or less. In the example shown in FIG. 3, the surface 20B opposed to the transparent substrate 20 is in contact with air, but another transparent layer whose refractive index is equivalent to refractive index nLL1 of the transparent layer LL1 may be disposed on the entire surface of the opposed surface 20B. When another layer is formed between the transparent substrate 10 and the transparent layer LL1, refractive index nLL1 of the transparent layer LL1 is smaller than the refractive index of the layer formed between the transparent substrate 10 and the transparent layer LL1.

Figure 4:
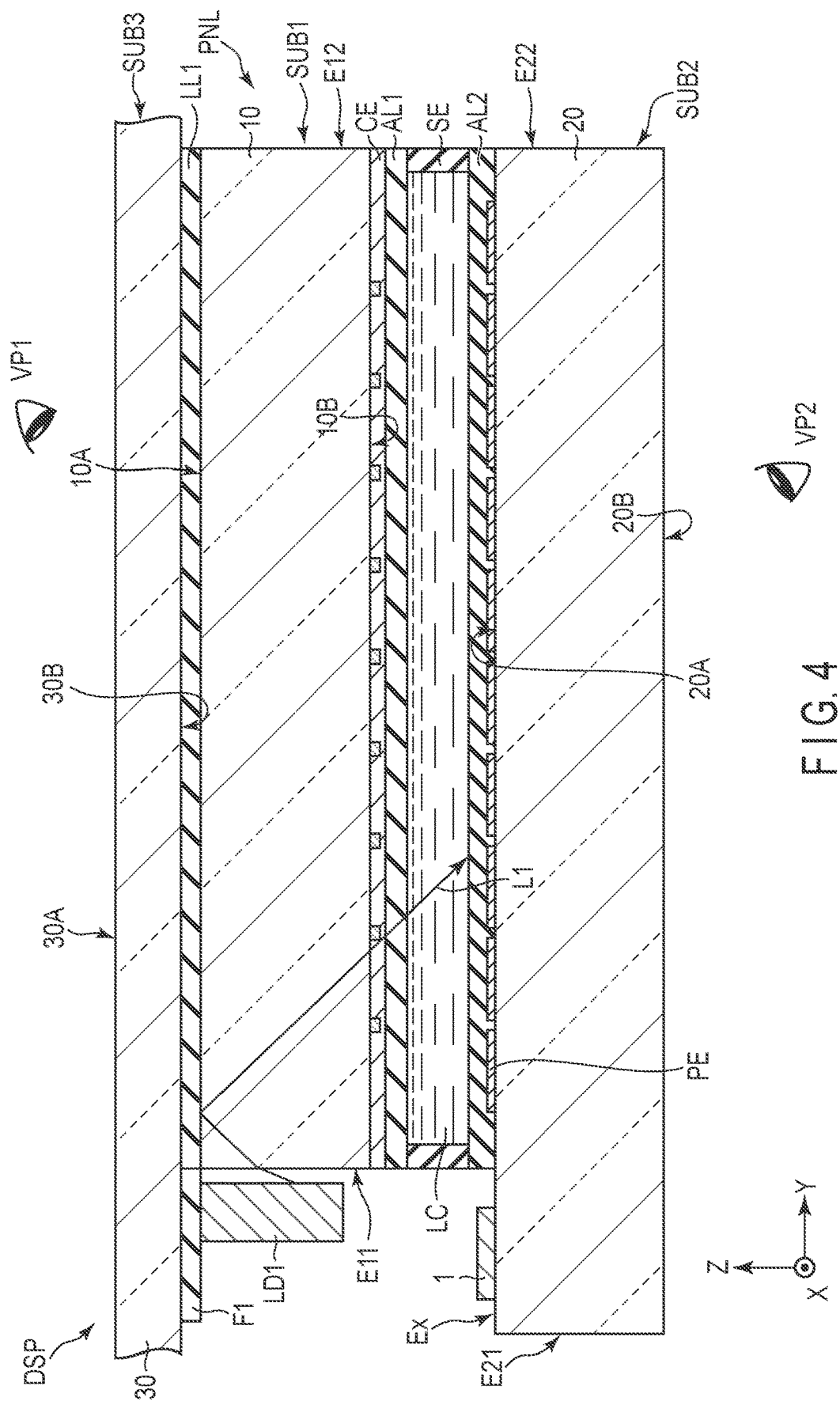
FIG. 4 is a sectional view showing an example of the configuration of the display device of the embodiment.

FIG. 4 is a sectional view showing an example of the configuration of the display device DSP of the present embodiment. As regards the display panel PNL, only the main component is shown. Light emitted from the light emitting element LD1 will be described with reference to FIG. 4.

In the example shown, the light emitting element LD1 is located between the second substrate SUB2 and the third substrate SUB3. In other words, the light emitting element LD1 is located between the transparent substrates 20 and 30. The light emitting element LD1 is located closer to the transparent substrate 30 in the third direction Z. The light emitting element LD1 is opposed to the side surface E11 of the transparent substrate 10 and is not opposed to the transparent substrate 20. Note that the light emitting element LD1 may be disposed opposite to the side surface E12. The wiring substrate F1 is located between the light emitting element LD1 and the third substrate SUB3. In other words, the wiring substrate F1 is located between the light emitting element LD1 and the transparent substrate 30. Even though the size of the transparent substrate 30 is equal to or smaller than that of the transparent substrate 10 in the second direction Y, the light emitting element LD1 is not opposed to the transparent substrate 30, for example.

The light emitting element LD1 emits light L1 toward the side surface E11. There is an air layer between the light emitting element LD1 and the side surface E11. The light L1 emitted from the light emitting element LD1 is refracted by the side surface E11 and enters the transparent substrate 10. Of the light L1 incident on the transparent substrate 10, light traveling toward the light shielding layer BM is reflected by the light shielding layer BM. Of the light L1 incident on the transparent substrate 10, light traveling toward the transparent layer LL1 is reflected by an interface between the transparent substrate 10 and the transparent layer LL1. Of the light L1 incident on the transparent substrate 10, light traveling between adjacent two light shielding layers BM enters the liquid crystal layer LC. In other words, of the light L1 incident on the transparent substrate 10, light traveling toward an area where the transparent substrate 10 and the common electrode CE are in contact with each other, enters the liquid crystal layer LC. Light L1 incident on the liquid crystal layer LC is transmitted through pixels in a transparent state and scattered by pixels in a scattered state. The display device DSP is capable of observation from an observation position VP1 close to the main surface 10A and also from an observation position VP2 on the opposed surface 20B. In addition, the display device DSP can observe its background regardless of whether observation is made from the observation position VP1 or the observation position VP2. Therefore, when observation is made from the observation positions VP1 and VP2, an image displayed on the display panel PNL by the light emitted from the light emitting element LD1 can be confirmed by superposing the image on the background opposed to the observation position VP1 or VP2 in an area where the display panel PNL is bonded to the third substrate SUB3 (transparent substrate 30).

According to the present embodiment, in an area including the transparent layer LL1, light emitted from the light emitting element LD1 is reflected by a boundary between the first substrate SUB1 (transparent substrate 10) and the transparent layer LL1, travels in the transparent substrate 10, and enters the liquid crystal layer LC. The light emitted from the light emitting element LD1 can thus be prevented from entering the third substrate SUB3 (transparent substrate 30). Accordingly, undesired absorption and scattering can be suppressed in the third substrate SUB3, and the light emitted from the light emitting element LD1 can efficiently be utilized in the display panel PNL. Therefore, the present embodiment can prevent the quality of display from being degraded.

Note that the foregoing display device DSP can be used, for example, as a backlight for partial driving (local dimming). For this reason, the display device DSP is sometimes referred to as an illumination device DSP. In addition, the scanning line G, signal line S, switching element SW and pixel electrode PE may be provided on the first substrate SUB1, and the common electrode CE may be provided on the second substrate SUB2.

Next is a description of another example of the configuration of the present embodiment.

FIG. 5 is a sectional view showing another example of the configuration the display device DSP shown in FIG. 3. The configuration shown in FIG. 6 differs from the configuration shown in FIG. 3 in that it includes an adhesive layer AD.

The adhesive layer AD is located between the transparent layer LL1 and the third substrate SUB3. In the example shown, the adhesive layer AD is located between the transparent layer LL1 and the transparent substrate 30 to cause the transparent layer LL1 and the transparent substrate 30 to adhere to each other. In other words, the adhesive layer AD causes the display panel PNL and the third substrate SUB3 (transparent substrate 30) to adhere to each other through the transparent layer LL1. Note that various layers may be formed between the adhesive layer AD and the transparent substrate 30. In addition, various layers may be formed between the adhesive layer AD and the transparent layer LL1. This configuration example can bring about the same advantages as those of the foregoing embodiment.

Figure 6:
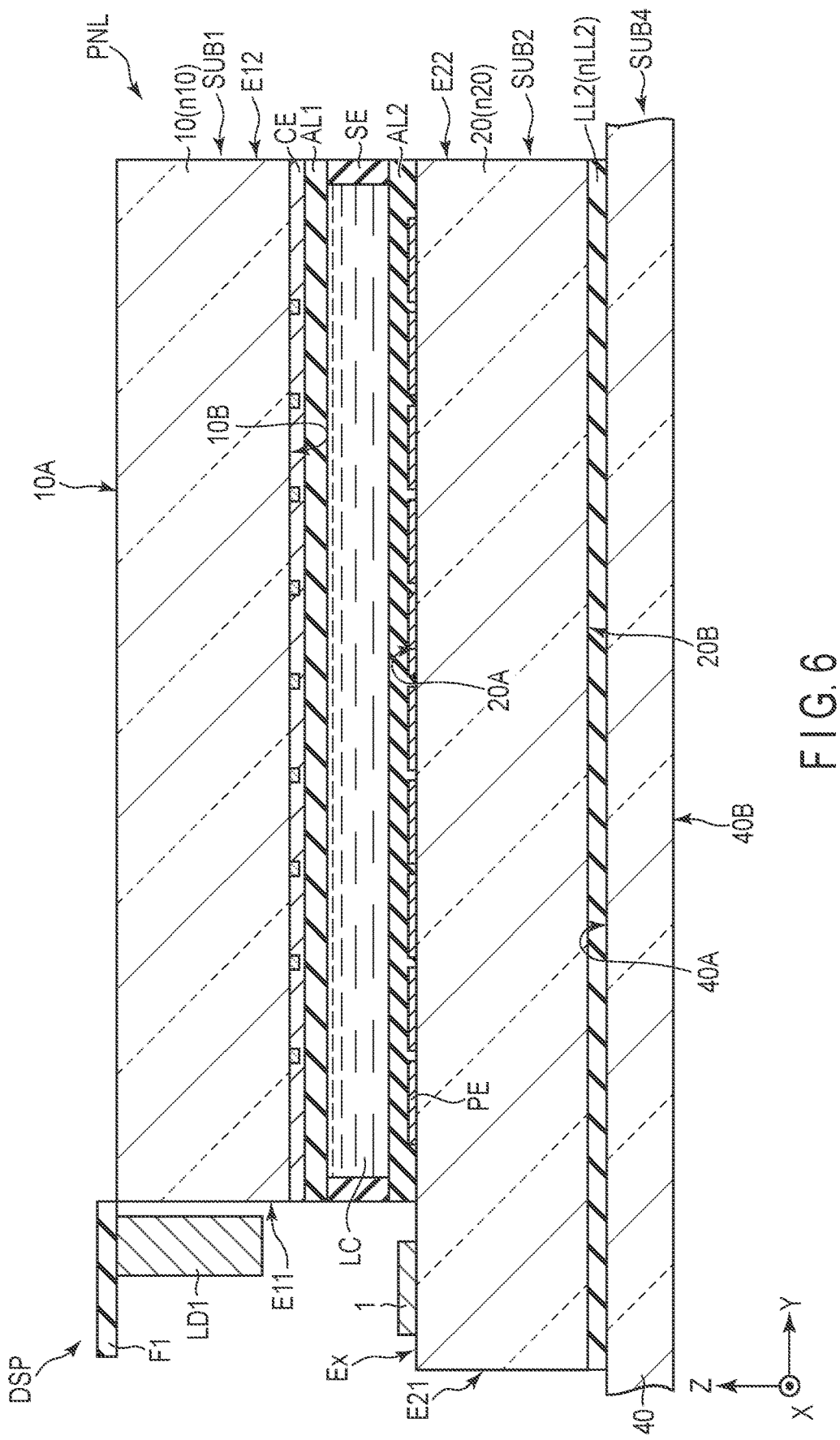
FIG. 6 is a sectional view showing another example of the configuration of the display device shown in FIG. 4.

FIG. 6 is a sectional view showing another example of the configuration the display device DSP shown in FIG. 4. The configuration shown in FIG. 6 differs from that shown in FIG. 4 in that it includes a fourth substrate SUB4 and a transparent layer LL2.

The display device DSP further includes a transparent layer LL2 and a fourth substrate SUB4. The fourth substrate SUB4 is opposed to the display panel PNL. In the example shown, the fourth substrate SUB4 is located opposite to the first substrate SUB1 with respect to the second substrate SUB2 in the third direction Z. The fourth substrate SUB4 includes a transparent substrate 40. The transparent substrate 40 is opposed to the display panel PNL. In the example shown, the transparent substrate 40 is located opposite to the first substrate SUB1 with respect to the second substrate SUB2 in the third direction Z. The transparent substrate 40 is larger than the transparent substrate 10 and the transparent substrate 20 in the X-Y plane. In other words, the transparent substrate 40 is larger than the display panel PNL in the X-Y plane. Note that the size of the transparent substrate 40 may be equal to or smaller than that of the second substrate SUB2 in the X-Y plane. The transparent substrate 40 may be formed of a plurality of transparent substrates. The second substrate SUB2 may include the transparent layer LL2.

The transparent substrate 40 has a main surface (top surface) 40A and a surface (undersurface) 40B opposed to the main surface 40A. The main surface 40A and opposed surface 40B expand substantially in parallel along the X-Y plane. The transparent substrate 40 is located closer to a surface 20B opposed to the transparent substrate 20. The main surface 40A of the transparent substrate 40 is opposed to the opposed surface 20B with the transparent layer LL2 therebetween. Note that the fourth substrate SUB4 is not limited to the example shown, but may include various layers as well as the transparent substrate 40.

The transparent layer LL2 is located between the second substrate SUB2 and the fourth substrate SUB4. In the example shown, the transparent layer LL2 is formed over the entire surface of the opposed surface 20B and is in contact with the opposed surface 20B and the main surface 40A. Note that the transparent layer LL2 may not be formed over the entire surface of the opposed surface 20B. Various layers may be formed between the transparent layer LL2 and the transparent substrate 20. In addition, various layers may be formed between the transparent layer LL2 and the transparent substrate 40.

The transparent substrate 40 is formed of, for example, the same material as that of the transparent substrate 30. The transparent layer LL2 is formed of, for example, the same material as that of the transparent layer LL1. The transparent layer LL2 has a refractive index of nLL2. The refractive index nLL2 is equal to, for example, nLL1. When another layer is formed between the transparent substrate 20 and the transparent layer LL2, the refractive index nLL2 of the transparent layer LL2 is smaller than the refractive index of the layer formed between the transparent substrate 20 and the transparent layer LL2.

This configuration example also brings about the same advantages as those of the foregoing embodiment.

Figure 7:
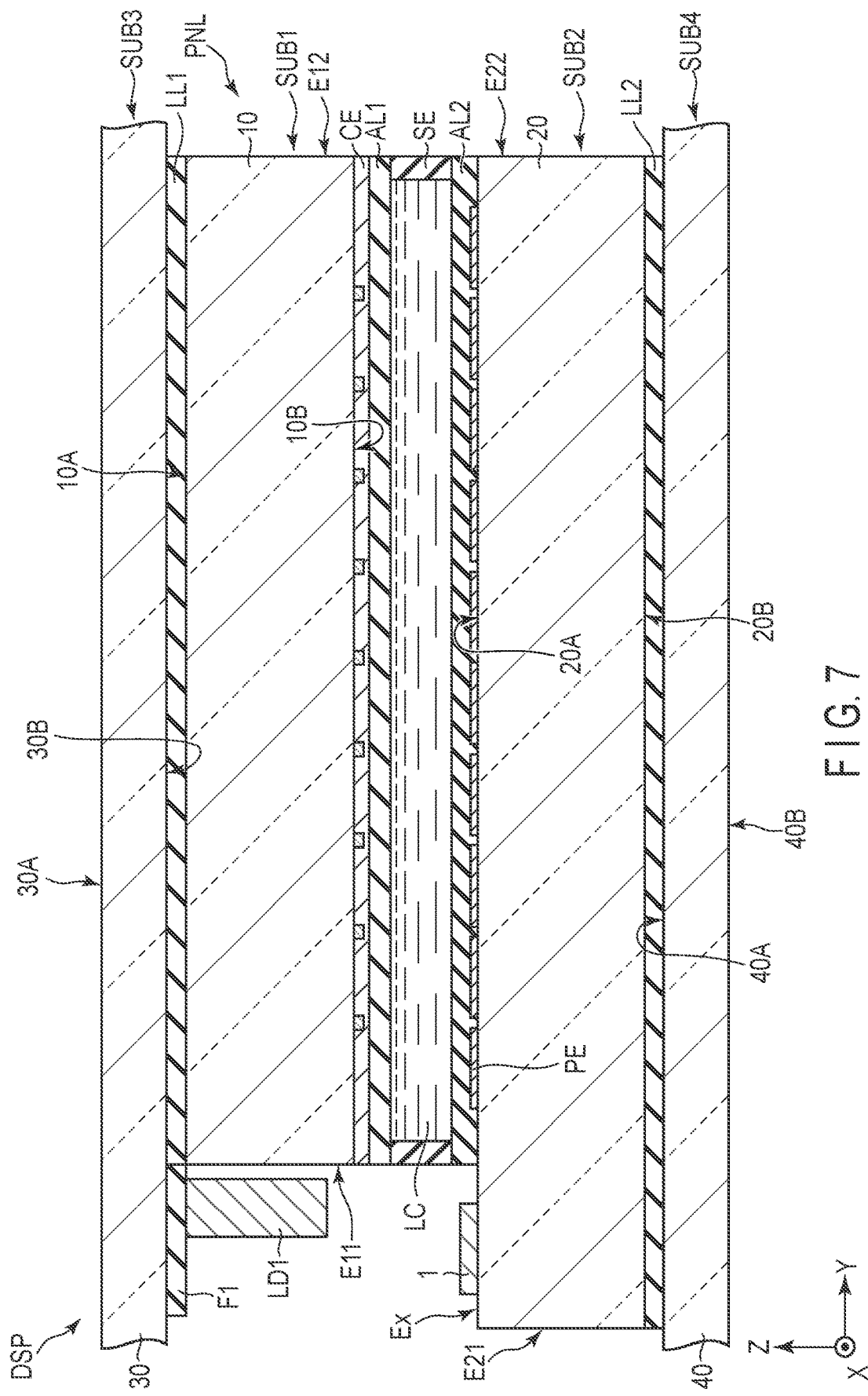
FIG. 7 is a sectional view showing another example of the configuration of the display device shown in FIG. 4.

FIG. 7 is a sectional view showing another example of the configuration of the display device DSP shown in FIG. 4. The configuration example shown in FIG. 7 corresponds to an example where the fourth substrate SUB4 and transparent layer LL2 shown in FIG. 6 are combined with the display device DSP shown in FIG. 4. This configuration example also brings about the same advantages as those of the foregoing embodiment.

FIG. 8 is a sectional view showing another example of the configuration of the display device DSP shown in FIG. 4. The configuration example shown in FIG. 8 is different in that a light emitting element LD2 is added to the display device DSP shown in FIG. 7.

The display device DSP further includes a light emitting element LD2. The light emitting element LD2 is opposed to the side surface E22. In the example shown, it is connected to a wiring substrate F2. The light emitting element LD2 has the same configuration as that of the light emitting element LD1, for example. The light emitting element LD2 is located between the third substrate SUB3 and the fourth substrate SUB4. In other words, the light emitting element LD2 is located between the transparent substrates 30 and 40. The light emitting element LD2 is located closer to the transparent substrate 40 in the third direction Z. The light emitting element LD2 is opposed to the side surface E22 of the transparent substrate 20 and is not opposed to the transparent substrate 40. Note that the light emitting element LD2 may be disposed opposite to the side surface E21. The wiring substrate F2 is located between the light emitting element LD2 and the transparent substrate 40. Even though the size of the transparent substrate 40 is equal to or smaller than that of the transparent substrate 20 in the second direction Y, the light emitting element LD1 is not opposed to the transparent substrate 40, for example. The light emitting element LD2 emits light toward the side surface E22. There is an air layer exists between the light emitting element LD2 and the side surface E22. Thus, light emitted from the light emitting element LD2 is refracted by the side surface E22 and enters the transparent substrate 20. Of the light incident on the transparent substrate 20, light traveling toward the transparent layer LL2 is reflected by an interface between the transparent substrate 20 and the transparent layer LL2. This configuration example also brings about the same advantages as those of the foregoing embodiment.

Another example of the configuration of the display device DSP will be described below with reference to FIGS. 9 and 10.

Figure 9:
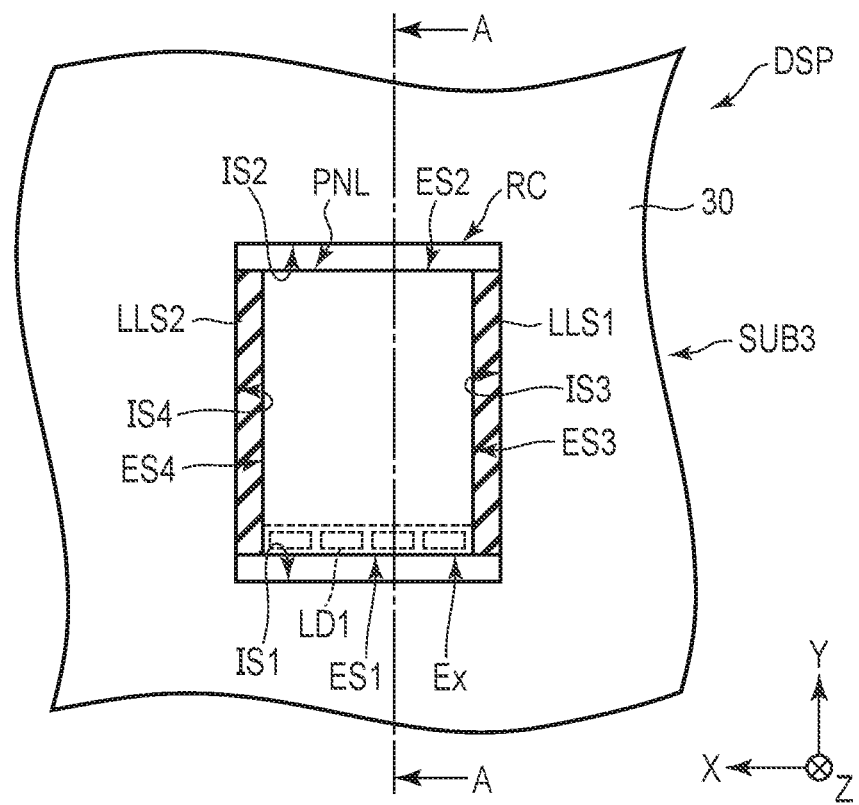
FIG. 9 is a plan view showing another example of the configuration of the display device of the embodiment.

FIG. 9 is a plan view showing another example of the configuration of the display device DSP of the present embodiment. The configuration example shown in FIG. 9 is different in that the display panel PNL is held in the third substrate SUB3.

The third substrate SUB3 has a recess RC. In the example shown, the recess portion RC is formed like a rectangle on the transparent substrate 30. In planar view, the recess portion RC is larger than the display panel PNL. The recess portion RC has an inner surface IS1 toward the second direction Y, an inner surface IS2 opposed to the inner surface IS1 in the second direction Y, an inner surface IS3 toward the first direction X, and an inner surface IS4 opposed to the inner surface IS3 in the second direction X. Note that the recess portion RC may be formed in a shape other than the rectangle, such as a circle and a polygon. The display panel PNL and the light emitting element LD1 are superposed on the recess portion RC. The side surface ES1 of the display panel PNL is opposed to the inner surface IS1. The side surface ES2 of the display panel PNL is opposed to the inner surface IS2. The side surface ES3 of the display panel PNL is opposed to the inner surface IS3. The side surface ES4 of the display panel PNL is opposed to the inner surface IS4. In the example shown in FIG. 9, the extended portion Ex and light emitting element LD1 are located closer to the inner surface IS1.

The display device DSP further includes transparent layers LLS1 and LLS2. The transparent layer LLS1 is located between the side surface ES3 of the display panel PNL and the inner surface IS3 of the recess portion RC. The transparent layer LLS2 is located between the side surface ES4 of the display panel PNL and the inner surface IS4 of the recess portion RC. The transparent layers LLS1 and LLS2 are formed of the same material as that of the transparent layer LL1, for example. Note that a transparent layer may be located between the side surface ES2 of the display panel PNL and the inner surface IS2 of the recess portion RC and between the side surface ES1 of the display panel PNL and the inner surface IS1 of the recess portion RC. The transparent layers LLS1 and LLS2 may be excluded. Instead of the transparent layers LLS1 and LL2, a reflective material that reflects light emitted from the display panel PNL, such as a mirror, may be disposed on the side surfaces ES3 and ES4. The recess portion RC may be opened in at least one of the first and second directions X and Y. For example, the recess portion RC may be opened in the first direction X. In this case, the recess portion RC does not have at least one of the inner surfaces IS3 and IS4. For example, the recess portion RC may be opened in the second direction Y. In this case, the recess portion RC does not have at least one of the inner surfaces IS1 and IS2.

Figure 10:
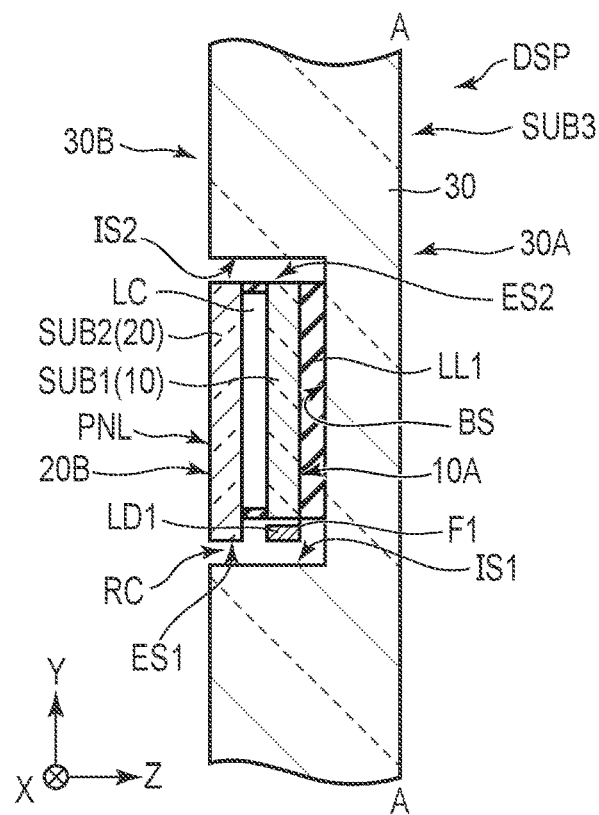
FIG. 10 is a sectional view of the display device along line A-A shown in FIG. 9.

FIG. 10 is a sectional view of the display device DSP along line A-A shown in FIG. 9. As regards the display panel PNL, only the main component is shown.

In the example shown, the recess portion RC is recessed from the opposed surface 30B toward the main surface 30A in the third direction Z. The recess portion RC has a bottom surface BS. The bottom surface BS is located closer to the main surface 30A than the opposed surface 30B in the third direction Z. The inner surfaces IS1 to IS4 extend from the bottom surface BS toward the third direction Z.

The display panel PNL is held in the recess portion RC. In the example shown, in the display panel PNL, the first substrate SUB1 is located closer to the bottom surface BS than the second substrate SUB2. In the display panel PNL, the second substrate SUB2 may be located closer to the bottom surface BS than the first substrate SUB1. The transparent layer LL1 is located between the first substrate SUB1 and the bottom surface BS. In other words, the transparent layer LL1 is located between the main surface 10A and the bottom surface BS. The transparent layer LL1 may be continuous with the transparent layers LLS1 and LLS2 shown in FIG. 9, or may be separate from the transparent layers LLS1 and LLS2. Note that the display panel PNL may be located outside or inside the opposed surface 30B in the third direction Z. In addition, the display panel PNL and light emitting element LD1 may be embedded in the transparent substrate 30.

This configuration example also brings about the same advantages as those of the foregoing embodiment can be obtained. In addition, the transparent layer LLS1 is located between the side surface ES3 of the display panel PNL and the inner surface IS3 of the recess portion RC, and the transparent layer LLS2 is located between the side surface ES4 of the display panel PNL and the inner surface IS4 of the recess portion RC. Light can be prevented from being emitted outward from the side surfaces ES3 and ES4. The light emitted from the light emitting element LD1 can thus be utilized efficiently in the display panel PNL. Therefore, the present embodiment can prevent the quality of display from being degraded.

Figure 11:
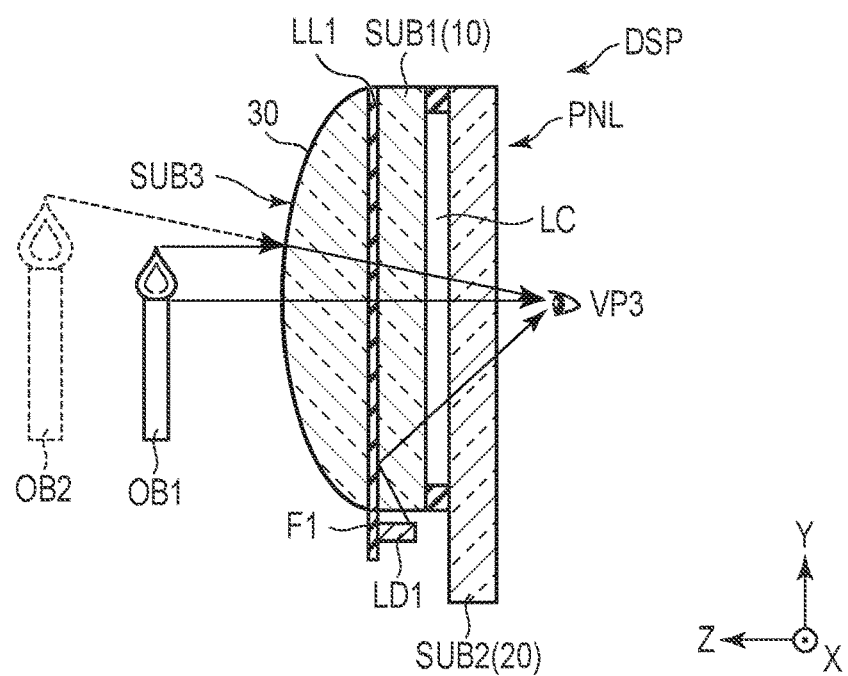
FIG. 11 is a sectional view showing another example of the configuration of the display device of the embodiment.

FIG. 11 is a sectional view showing another example of the configuration of the display device DSP according to the present embodiment. The configuration example shown in FIG. 11 is different in that the transparent substrate 30 is a lens. As regards the display panel PNL, only the main component is shown.

The transparent substrate 30 is a lens. In the example shown, the transparent substrate 30 is of the same size as the transparent substrate 10. Note that the transparent substrate 30 may be smaller or larger than the transparent substrate 10. Assume that in the third direction Z, an observation target OB1, which is located away from the third substrate SUB3 in the direction of the arrow of the third direction Z, is observed from an observation position VP3 where the display panel PNL is observed from the second substrate SUB2. In an area where the display panel PNL is bonded to the transparent substrate 30, the observation target OB1 imaged by the transparent substrate 30 is superposed on an observation target OB2 corresponding to an enlarged image (virtual image), with the result that an image displayed on the display panel PNL by the light emitted from the light emitting element LD1 can be confirmed.

This configuration example also brings about the same advantages as those of the foregoing embodiment.

As described above, the present embodiment can provide a display device capable of preventing the quality of display from being degraded.

An example of a display device attained from the configuration disclosed herein will be added below.

(1) A display device comprising:
a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, and a liquid crystal layer located between the first substrate and the second substrate and containing striped polymers and liquid crystal molecules;
a light emitting element opposed to the side surface to emit light toward the side surface;
a third transparent substrate opposed to the display panel; and
a transparent layer located between the display panel and the third transparent substrate and having a second refractive index that is lower than a first refractive index of the first transparent substrate and the second transparent substrate.

(2) The display device described in (1), wherein the third transparent substrate is a glass substrate.

(3) The display device described in (1) or (2), wherein the third transparent substrate is larger than the display panel.

(4) The display device described in one of (1) to (3), wherein:

the third transparent substrate is opposed to the first main surface; and the transparent layer is in contact with the first main surface.

(5) The display device described in one of (1) to (3), wherein:

the third transparent substrate is opposed to the second opposite surface; and the transparent layer is in contact with the second opposite surface.

(6) The display device described in (3), wherein:

the third transparent substrate includes a recess portion having a bottom surface, a first inner surface, and a second inner surface opposed to the first inner surface; and the display panel is held in the recess portion.

(7) The display device described in (3), wherein:

the display panel has a first surface intersecting the side surface and opposed to the first inner surface and a second surface opposed to the second inner surface; and the transparent layer is located between the first main surface and the bottom surface, between the second side surface and the first inner surface, and between the second surface and the second inner surface.

(8) The display device described in one of (1) to (7), wherein the third transparent substrate is a lens.

(9) The display device described in one of (1) to (7), wherein the third transparent substrate is a film.

(10) The display device described in one of (1) to (7), wherein the third transparent substrate is a touch panel.

(11) The display device described in one of (1) to (10), wherein:

the first substrate includes a common electrode located closer to the first main surface; and the second substrate includes a scanning line and a signal line which are located closer to the second main surface, a switching element electrically connected to the scanning line and the signal line, and a pixel electrode electrically connected to the switching element and opposed to the common electrode.

(12) The display device described in one of (1) to (11), wherein the second refractive index is 1.0 or more to 1.41 or less.

(13) An illumination device comprising:

a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, and a liquid crystal layer located between the first substrate and the second substrate and containing striped polymers and liquid crystal molecules;

a light emitting element opposed to the side surface to emit light toward the side surface;

a third transparent substrate opposed to the display panel; and a transparent layer located between the display panel and the third transparent substrate and having a second refractive index that is lower than a first refractive index of the first transparent substrate and the second transparent substrate.

(14) A display device comprising:

a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, a liquid crystal layer located between the first substrate and the second substrate and containing striped polymers and liquid crystal molecules, and a transparent layer having a second refractive index that is lower than a first refractive index of the first transparent substrate and the second transparent substrate and provided on at least one of the first main surface and the second opposite surface; and a light emitting element opposed to the side surface to emit light toward the side surface.

(15) A display device comprising:

a display panel including a first substrate including a first transparent substrate having a first main surface, a first opposite surface of the first main surface and a first side surface, a second substrate including a second transparent substrate having a second main surface opposed to the first opposite surface, a second opposite surface of the second main surface and a second side surface, and a liquid crystal layer located between the first substrate and the second substrate and containing striped polymers and liquid crystal molecules;

a first light emitting element opposed to the first side surface to emit light toward the first side surface;

a third substrate opposed to the display panel; and a first transparent layer located between the display panel and the third substrate and having a second refractive index that is lower than a first refractive index of the first transparent substrate and the second transparent substrate.

(16) The display device described in (15), wherein:

the third substrate is opposed to the first main surface; and the first transparent layer is in contact with the first main surface.

(17) The display device described in (16), further comprising a fourth substrate opposed to the second opposite surface and a second transparent layer located between the second opposite surface and the fourth substrate and having the second refractive index.

(18) The display device described in (17), wherein the second transparent layer is in contact with the second opposite surface.

(19) The display device described in one of (15) to (18), further comprising a second light emitting element opposed to the second side surface to emit light toward the second side surface.

(20) The display device described in one of (15) to (19), wherein the second substrate includes an extended portion that extends outward from the first side surface.

(21) The display device described in one of (15) to (20), wherein the third substrate is a glass substrate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, and a liquid crystal layer located between the first substrate and the second substrate and containing striped polymers and liquid crystal molecules;
a light emitting element opposed to the side surface to emit light toward the side surface;
a third transparent substrate opposed to the display panel;
a first transparent layer located between the display panel and the third transparent substrate and having a second refractive index that is lower than a first refractive index of the first transparent substrate and the second transparent substrate;
a fourth transparent substrate opposed to the display panel on an opposite side to the third transparent substrate; and
a second transparent layer located between the display panel and the fourth transparent substrate and having the second refractive index, wherein
the third transparent substrate is larger than the display panel,
the third transparent substrate and the fourth transparent substrate have a third refractive index, and
the second refractive index is lower than the third refractive index.

2. The display device of claim 1, wherein the third transparent substrate is a glass substrate.

3. The display device of claim 1, wherein:
the third transparent substrate is opposed to the first main surface; and
the transparent layer is in contact with the first main surface.

4. The display device of claim 1, wherein:
the third transparent substrate includes a recess portion having a bottom surface, a first inner surface, and a second inner surface opposed to the first inner surface; and
the display panel is held in the recess portion.

5. The display device of claim 4, wherein:
the display panel has a first surface intersecting the side surface and opposed to the first inner surface and a second surface opposed to the second inner surface; and
the transparent layer is located between the first main surface and the bottom surface, between the first surface and the first inner surface, and between the second surface and the second inner surface.

6. The display device of claim 1, wherein the third transparent substrate is a lens.

7. The display device of claim 1, wherein the third transparent substrate is a film.

8. The display device of claim 1, wherein the third transparent substrate is a touch panel.

9. The display device of claim 1, wherein:
the first substrate includes a common electrode located closer to the first opposite surface; and
the second substrate includes a scanning line and a signal line which are located closer to the second main surface, a switching element electrically connected to the scanning line and the signal line, and a pixel electrode electrically connected to the switching element and opposed to the common electrode.

10. The display device of claim 1, wherein the second refractive index is 1.0 or more to 1.41 or less.

11. An illumination device comprising:
a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, and a liquid crystal layer located between the first substrate and the second substrate and containing striped polymers and liquid crystal molecules;
a light emitting element opposed to the side surface to emit light toward the side surface;
a third transparent substrate opposed to the display panel;
a first transparent layer located between the display panel and the third transparent substrate and having a second refractive index that is lower than a first refractive index of the first transparent substrate and the second transparent substrate;
a fourth transparent substrate opposed to the display panel on an opposite side to the third transparent substrate; and
a second transparent layer located between the display panel and the fourth transparent substrate and having the second refractive index, wherein
the third transparent substrate is larger than the display panel,
the third transparent substrate and the fourth transparent substrate have a third refractive index, and
the second refractive index is lower than the third refractive index.

12. A display device comprising:
a display panel including a first substrate including a first transparent substrate having a first main surface, a first opposite surface of the first main surface and a side surface, a second substrate including a second transparent substrate having a second main surface opposed to the first opposite surface and a second opposite surface of the second main surface, a liquid crystal layer located between the first substrate and the second substrate and containing striped polymers and liquid crystal molecules, and a transparent layer having a second refractive index that is lower than a first refractive index of the first transparent substrate and the second transparent substrate and provided on at least one of the first main surface and the second opposite surface;
a light emitting element opposed to the side surface to emit light toward the side surface; and
a third transparent substrate opposed to at least one of the first main surface and the second opposite surface, the transparent layer being provided between the display panel and the third transparent substrate, wherein
the third transparent substrate is lamer than the display panel,
the third transparent substrate has a third refractive index, and
the second refractive index is lower than the third refractive index.

* * * * *